(12) United States Patent
Owen et al.

(10) Patent No.: US 9,919,738 B2
(45) Date of Patent: Mar. 20, 2018

(54) VEHICLE CONTROL SYSTEM AND METHOD

(71) Applicant: Jaguar Land Rover Limited, Whitley, Coventry, Warwickshire (GB)

(72) Inventors: Simon Owen, Brockhill (GB); Karl Richards, Leamington Spa (GB); Andrew Maskell, Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 58 days.

(21) Appl. No.: 14/917,944

(22) PCT Filed: Sep. 9, 2014

(86) PCT No.: PCT/EP2014/069221
§ 371 (c)(1),
(2) Date: Mar. 9, 2016

(87) PCT Pub. No.: WO2015/032994
PCT Pub. Date: Mar. 12, 2015

(65) Prior Publication Data
US 2016/0214645 A1 Jul. 28, 2016

(30) Foreign Application Priority Data
Sep. 9, 2013 (GB) .................................. 1316039.5

(51) Int. Cl.
*B62D 15/02* (2006.01)
*B60W 10/20* (2006.01)
(Continued)

(52) U.S. Cl.
CPC .......... *B62D 15/025* (2013.01); *B60T 8/1755* (2013.01); *B60T 8/17552* (2013.01);
(Continued)

(58) Field of Classification Search
CPC ... B62D 15/02; B62D 15/025; B60W 650/08; B60W 10/04; B60W 30/18; B60W 10/20
(Continued)

(56) References Cited

U.S. PATENT DOCUMENTS 7,062,382 B2  6/2006 Courtenay et al.
7,257,474 B2  8/2007 Kato et al.
(Continued)

FOREIGN PATENT DOCUMENTS

DE  102005009811 A1  9/2005
EP       1584540 A2  4/2005
(Continued)

OTHER PUBLICATIONS

Fausten et al., "Kopplung von Bremssystemen and elektrischer Servolenkung zur Darstellung von Fahrerassistenzsystemen", (not translated), Tagung "Aktive Sicherheit durch Fahrerassistenz" Technische Universitat München, Mar. 12, 2004, accessed at http://mediatum.ub.tum.de/doc/1145546/1145546.pdf, 16 pages.
(Continued)

*Primary Examiner* — Tan Q Nguyen
(74) *Attorney, Agent, or Firm* — Reising Ethington P.C.

(57) ABSTRACT

Embodiments of the present invention provide a control system for a motor vehicle comprising: means for detecting a side-slope condition in which a vehicle is traversing a side-slope; and means for controlling an amount of torque applied to one or more wheels to induce a turning moment on a vehicle, the system being configured to cause a turning moment to be induced in a direction opposing side-slip of a trailing axle in a down-slope direction relative to a leading axle.

36 Claims, 5 Drawing Sheets

(51) Int. Cl.
   B62D 6/00      (2006.01)
   B62D 6/04      (2006.01)
   B60T 8/1755    (2006.01)
   B60W 10/06     (2006.01)
   B60W 10/10     (2012.01)
   B60W 10/184    (2012.01)
   B60W 10/22     (2006.01)
   B60W 30/02     (2012.01)
   B60W 30/182    (2012.01)

(52) U.S. Cl.
   CPC ............ *B60W 10/06* (2013.01); *B60W 10/10* (2013.01); *B60W 10/184* (2013.01); *B60W 10/20* (2013.01); *B60W 10/22* (2013.01); *B60W 30/02* (2013.01); *B60W 30/182* (2013.01); *B62D 6/003* (2013.01); *B62D 6/007* (2013.01); *B62D 6/04* (2013.01); *B62D 15/021* (2013.01); *B60W 2300/185* (2013.01); *B60W 2520/10* (2013.01); *B60W 2540/18* (2013.01); *B60W 2550/14* (2013.01); *B60W 2720/14* (2013.01)

(58) Field of Classification Search
   USPC .................................... 701/41; 180/422, 446
   See application file for complete search history.

(56) References Cited

U.S. PATENT DOCUMENTS

| | | |
|---|---|---|
| 7,295,906 B2 | 11/2007 | Asano |
| 8,200,391 B2 | 6/2012 | Sakugawa et al. |
| 8,380,416 B2 | 2/2013 | Offerle et al. |
| 2003/0200016 A1* | 10/2003 | Spillane ............. B60G 17/0195 701/36 |
| 2005/0216156 A1* | 9/2005 | Asano .................. G05D 1/0891 701/41 |
| 2005/0224277 A1* | 10/2005 | Kato ..................... B60W 10/10 180/422 |
| 2007/0021875 A1 | 1/2007 | Naik et al. |
| 2008/0114511 A1* | 5/2008 | Sakugawa ............. B60T 8/1755 701/41 |

FOREIGN PATENT DOCUMENTS

| | | |
|---|---|---|
| GB | 2394702 A | 5/2004 |
| GB | 2412099 A | 9/2005 |
| GB | 2435023 A | 8/2007 |
| WO | WO2006123215 A2 | 11/2006 |

OTHER PUBLICATIONS

Combined Search and Examination Report corresponding to application No. GB1316039.5, dated Apr. 23, 2014, 9 pages.
International Search Report corresponding to International application No. PCT/EP2014/069221, dated Dec. 19, 2014, 6 pages.
Written Opinion corresponding to International application No. PCT/EP2014/069221, dated Dec. 19, 2014, 9 pages.
Combined Search and Examination Report corresponding to application No. GB1415926.3, dated Mar. 6, 2015, 8 pages.

* cited by examiner

| SP = Speed Proportional<br>TM = Towing Mode | | Motorway | Country Road | City Driving | Towing (on Road) | Dirt Track (Developing World Road) | Snow / Ice (Scandinavian / North America Conditions) | Grass/ gravel/ snow | Sand | Rock/ Crawl/ Boulder Crossing | Mud & ruts |
|---|---|---|---|---|---|---|---|---|---|---|---|
| Suspension Ride Height | High | | | | | | | | | X | |
| | Standard | | X | X | X | X | X | X | X | | X |
| | Low | X | | | | | | | | | |
| Side / Side Air Interconnection | Closed | X | X | X | X | X | X | | | | X |
| | Open | | | | | | | X | X | X | |
| Steering Assistance Level | High | SP | SP | SP | SP | SP | SP | SP | SP | X | SP |
| | Low | | | | | | | | | | |
| Brake Pedal Efforts | High | X | X | X | | X | X | X | X | X | X |
| | Low | | (X) | X | X | | | | | X | |
| A.B.S. Mode | High mu | X | X | X | X | X | | X | | X | |
| | Low mu | | | | | | X | | X | | X |
| | Plough Surface | | | | | | | | | | |
| E.T.C. Mode | High mu | X (2) | X | X | X | X | X | X | X | X | X |
| | Low mu | | | | | | | | | X | |
| D.S.C. Mode | High mu | X | X | X | TM | X | X | X | X | X | X |
| | Low mu | | | | | | | | | | |
| Throttle Progression | Quick | | (X) | X | (X) | | | | X | | X |
| | Slow | X | X | X | X | X | X | X | | X | X |
| Transfer Box | High Range | X | X | X | X | X | X | X | X | X | X |
| | Low Range | | | | | | | | | | |
| Auto Transmission | Normal Mode | X | | X | X | X | X | | | | |
| | Performance Mode | | X | | | | | | | | |
| | Snow Mode | | | | | | | X | | | X |
| | Sand Mode | | | | | | | | X | | |
| | Manual Mode | | (X) | | | | | | | X | |
| Centre Diff Lock | Open | X | X | X | X | X | X | X | X | X | X |
| | Locked | | | | | | | | | | |
| Rear Diff Lock | Open | X | X | X | X | X | X | X | (X) | X | X |
| | Locked | | | | | | | | | | |

FIGURE 3

VEHICLE CONTROL SYSTEM AND METHOD

INCORPORATION BY REFERENCE

The entire contents of co-pending UK patent application numbers GB1111288.5, GB1211910.3 and GB1202427.9 and UK patents GB2325716, GB2308415, GB2341430, GB2382158 and GB2381597, GB2492655 and US patent application US2003/0200016 are expressly incorporated herein by reference.

FIELD OF THE INVENTION

The present invention relates to a vehicle control system for one or more vehicle subsystems and to a method of controlling one or more vehicle subsystems.

BACKGROUND

It is known to provide a vehicle having a plurality of subsystems which can be operated in different configurations to suit different driving conditions. For example, automatic transmissions may be controlled in a variety of modes such as sport, manual, winter or economy. In each mode, subsystem control parameters such as accelerator pedal response and conditions under which changes between gear ratios take place may be modified so as to suit the conditions of the terrain or the particular taste of the driver. It is also known to provide air suspensions with on-road and off-road modes. Stability control systems can be operated at reduced activity in certain modes so as to give the driver more direct control, and power steering systems can be operated in different modes to provide a varying level of assistance depending on driving conditions.

It is desirable to provide an improved control system for a motor vehicle operable in different configurations.

STATEMENT OF THE INVENTION

Embodiments of the invention may be understood with reference to the appended claims.

Aspects of the present invention provide a control system, a vehicle and a method.

Control systems according to embodiments of the present invention are suitable for a range of different vehicles including conventional engine-only vehicles, electric vehicles, and/or hybrid electric vehicles.

According to an aspect of the invention for which protection is sought there is provided a control system for a motor vehicle comprising: means for detecting a driver-requested steering angle of a vehicle; means for inducing a turning moment on a vehicle; and means for receiving a driving condition signal indicative of a driving condition of a vehicle, the system being configured to adjust a net turning moment on a vehicle in response to the driver-requested steering angle in dependence at least in part on the driving condition signal.

The control system may be configured to operate in a selected one of a plurality of control modes of at least one subsystem of a vehicle, the system comprising a subsystem controller for initiating control of at least one subsystem in the selected one of the plurality of subsystem control modes, each of which corresponds to one or more of the different driving conditions, wherein the driving condition signal is indicative of the selected control mode.

For example, a vehicle may have different control modes depending on terrain, such as a control mode for driving on surfaces offering a relatively low friction surface coefficient of friction with roadwheels of the vehicle, such as a grass/gravel/snow (GGS) control mode and a control mode for driving on surfaces offering a medium surface coefficient of friction with roadwheels, such as a mud/ruts (MR) control mode. The driving condition signal may indicate which control mode the control system is operating in. The turning moment may be adjusted by the system differently, for a given vehicle speed and steering angle, depending on the selected control mode. In some embodiments, in one or more control modes the turning moment may not be adjusted by the system.

The control system may be configured to cause an initial change in turning moment on the vehicle in response to the driver-requested steering angle, the initial change in turning moment being determined in dependence at least in part on the driving condition signal.

Optionally, the amount by which the turning moment is adjusted may be arranged to increase as a function of time.

Thus, the control system may be configured to cause an increase or decrease in turning moment, such that the amount of the increase or decrease in turning moment relative to that which would prevail in the absence of any adjustment changes as a function of time.

Optionally, the rate of increase of the amount by which the turning moment is adjusted is determined in dependence on the driving condition signal.

The turning moment may be induced in the direction of turn indicated by the steering angle so as to increase a turning moment induced on a vehicle by a steering system.

The function of inducing a turning moment on a vehicle in dependence at least in part on the driving condition signal may be referred to as a steering assist function. The system may be operable to allow a user to disable the steering assist function, optionally by means of a physical switch or button, and/or by means of a touchscreen. Other arrangements are also useful. The system may be configured to allow a user to enable or disable the steering assist function, optionally by means of a user input, optionally by means of a physical switch or button, and/or by means of a touchscreen. Thus the function may only operate if the user enables the function by means of the user input in some embodiments.

Embodiments of the present invention enable automatic control of a turning circle of a vehicle according to the driving condition in which the vehicle is being driven. If the driving condition signal is indicative at least in part of a nature of a driving surface over which a vehicle is driving, the system may vary the amount of steering assistance that is provided automatically, according to the driving surface, by reference to the driving condition signal.

The control system may be configured to adjust the net turning moment on a vehicle so as to increase a rate of turn of a vehicle in a direction corresponding to a driver-requested steering angle in dependence on the driving condition signal.

Optionally, the control system is configured to adjust the net turning moment on a vehicle to increase a rate of turn when the driving condition signal corresponds to one of a first set of one or more driving conditions.

Optionally, the control system is configured to adjust the net turning moment on a vehicle so as to decrease a rate of turn of a vehicle in a direction corresponding to a driver-requested steering angle in dependence on the driving condition signal.

Optionally, the control system is configured to adjust the net turning moment on a vehicle to decrease a rate of turn when driving condition signal corresponds to one of a second set of one or more driving conditions.

Thus it is to be understood that the system may be configured to cause an increase in the net turning moment on a vehicle when the driving condition signal indicates a vehicle is operating in one of a first set of one or more driving conditions, and to decrease the net turning moment on a vehicle when the driving condition signal indicates a vehicle is operating in one a second set of one or more driving conditions.

The second set of one or more driving conditions may be different from the first.

Optionally, the control system is configured to adjust a net turning moment on a vehicle in response to the driver-requested steering angle in dependence at least in part on the driving condition signal, at least in part by adjusting a steerable road wheel angle.

Optionally, the control system is configured to adjust a net turning moment on a vehicle in response to the driver-requested steering angle in dependence at least in part on the driving condition signal, at least in part by torque vectoring.

Optionally, the control system is configured wherein torque vectoring is accomplished by varying the amount of torque applied to one or more wheels of a vehicle in order to induce a turning moment. Thus the amount of torque applied to one or more wheels may be changed temporarily in order to induce the turning moment. The change may be a change relative to the torque applied to one or more other wheels in order to induce the turning moment.

Optionally, the control system is configured wherein torque vectoring may be accomplished at least in part by brake torque vectoring.

Optionally, the control system is configured wherein torque vectoring may be accomplished at least in part by powertrain torque vectoring.

In some embodiments, the turning moment may be induced by powertrain torque vectoring when a driver depresses an accelerator pedal and brake torque vectoring when a driver is not depressing an accelerator pedal.

The powertrain torque or brake torque differences may advantageously be established across a trailing axle and/or across a leading axle.

Optionally, the control system is operable in a manual control mode selection condition in which a user may select a required system control mode by means of user-operable mode selection input means.

Optionally, the control system is operable in an automatic mode selection condition in which the system is configured to select automatically an appropriate system control mode.

Optionally, the control system comprises evaluation means for evaluating one or more driving condition indicators to determine the extent to which each of the subsystem control modes is appropriate, the system being configured in the automatic mode selection condition automatically to control the subsystem controller to initiate control of one or more subsystems in the subsystem control mode which is most appropriate.

Optionally, the control modes are control modes of at least one vehicle subsystem selected from amongst an engine management system, a transmission system, a steering system, a brakes system and a suspension system.

Optionally the control modes are control modes of at least two vehicle subsystems selected from amongst an engine management system, a transmission system, a steering system, a brakes system and a suspension system.

The operating modes may be control modes of each of these systems.

Optionally, in each control mode the system is configured to cause each of the one or more vehicle subsystems to be operated in a subsystem configuration mode appropriate to the driving condition.

For example, in the case of a vehicle sub-system in the form of a suspension system operable at a plurality of different ride-heights for a given vehicle loading, the subsystem configuration modes may include modes corresponding to different respective ride heights. In the case of a vehicle sub-system controller in the form of an engine or powertrain controller, the controller may be operable to provide different respective values of engine torque as a function of accelerator pedal position in each of a plurality of different powertrain controller configuration modes. A subsystem control mode may therefore correspond to a set of subsystem configuration modes, for example one configuration mode for each subsystem. For example in one operating mode a 'high' ride height subsystem configuration mode may be set for the suspension system and a 'slow' accelerator pedal map subsystem configuration mode may be set for the powertrain controller. Some subsystems may allow two different parameters to be set. Thus the suspension system may allow a vehicle body roll stiffness setting of the suspension to be set to one of a plurality of configuration modes such as low, medium or high.

Various possible known subsystem configuration modes will now be described. The reader is referred to US2003/0200016 for further details in respect of known types of subsystem configuration mode and the manner in which the configuration modes may be implemented. Other configuration modes are also useful. Other subsystems may also be controlled, in addition or instead.

Optionally, the control modes include control modes of a suspension system and the plurality of subsystem configuration modes comprise a plurality of ride heights.

Optionally, the control modes include control modes of a fluid suspension system in which fluid interconnection can be made between suspensions for wheels on opposite sides of the vehicle, and wherein said plurality of subsystem configuration modes provide different levels of said interconnection.

Optionally, the control modes include control modes of a steering system which can provide steering assistance, and wherein said plurality of subsystem configuration modes provide different levels of said steering assistance.

Optionally, the control modes include control modes of a brakes system which can provide braking assistance, and said plurality of subsystem configuration modes provide different levels of said braking assistance.

Optionally, the control modes include control modes of a brake control system which can provide an anti-lock function to control wheel slip, and said plurality of subsystem configuration modes allow different levels of said wheel slip.

Optionally, the control modes include control modes of a traction control system which is arranged to control wheel spin, and said plurality of subsystem configuration modes allow different levels of said wheel spin.

Optionally, the control modes include control modes of a yaw control system which is arranged to control vehicle yaw, and said plurality of subsystem configuration modes allow different levels of divergence of said vehicle yaw from an expected yaw.

Optionally, the control modes include control modes of a range change transmission and said subsystem configuration modes include a high range mode and a low range mode of said transmission.

The range change transmission may for example be comprised by a power transfer unit or power take-off unit for coupling a prop shaft of a driveline to a torque transmission path from an engine or transmission of the vehicle, such as an automatic transmission.

Optionally, the control modes include control modes of a powertrain system which includes a powertrain control means and an accelerator or throttle pedal, the subsystem configuration modes providing different levels of responsiveness of the powertrain control means to movement of the accelerator or throttle pedal.

Optionally, the control modes include control modes of a transmission system operable in a plurality of transmission ratios and including a transmission control means (such as an electronic transmission controller) arranged to monitor at least one parameter of the vehicle and to select the transmission ratios in response, and wherein the subsystem configuration modes include a plurality of transmission configuration modes in which the transmission ratios are selected differently in response to said at least one parameter.

One of the subsystems may comprise a differential system operable to provide a plurality of levels of differential lock, and the subsystem configuration modes may be arranged to provide different levels of said lock.

The differential system may be arranged to control the level of differential lock on the basis of a plurality of inputs, and to respond differently to said inputs in each of the modes.

The differential system may comprise a center differential, a front differential and/or a rear differential. The differential may be a clutch-based system in some embodiments, whereby differences in rates of rotation of wheels is accommodated by slipping of a clutch rather than by means of a conventional differential gear arrangement in which side wheels are coupled via pinion wheels supported by a differential cage in order to allow relative rotation.

One of the subsystems may comprise a vehicle body roll control system arranged to provide body roll correction to reduce vehicle body roll and the subsystem configuration modes provide different levels of body roll correction of the vehicle, at least under some driving conditions.

One of the subsystems may comprise a speed control system arranged to control the speed of the vehicle when descending a hill. The speed control system may be arranged to control the vehicle to different speeds in the different configuration modes.

Optionally, the operating modes may include an off-road mode in which the subsystems are controlled in a manner suitable for driving on rough terrain and an on-road mode in which the subsystems are controlled in a manner suitable for driving on-road.

Optionally the suspension system is arranged to provide a higher ride height in the off road mode than in the on-road mode.

Further optionally, in the off-road mode a higher level of said interconnection is provided than in the on-road mode.

The traction control system may be arranged to allow less wheel spin in the off-road mode than in the on-road mode.

Optionally the yaw control system is arranged to allow a higher degree of said divergence in the off-road mode than in the on-road mode.

Optionally, in the off-road mode the range change transmission is operated in the low range.

Optionally, in the off-road mode the powertrain control means is arranged to provide lower levels of drive torque, for a given accelerator or throttle pedal position, at least at low levels of accelerator pedal depression, than in the on-road mode.

Optionally, the differential system is arranged to provide higher levels of differential lock in the off-road mode than in the on-road mode.

Optionally, the vehicle body roll control system is arranged to provide a higher body roll stiffness in the on-road mode than in the off-road mode.

Optionally, the speed control system is arranged not to be placed in an operational state in the off-road mode and to be placed in an operational state in the on-road mode.

Optionally, the driving modes include at least one low friction mode in which the subsystems are controlled in a manner suitable for driving on low friction surfaces and a high friction mode in which the subsystems are controlled in a manner suitable for driving on high friction surfaces.

Optionally, the brake control system allows higher levels of slip in the high friction mode than in the low friction mode. Alternatively, the brake control system may allow higher levels of slip in the low friction mode than in the high friction mode.

Optionally, the traction control system allows higher levels of wheel spin in the high friction mode than in the low friction mode. Alternatively, the traction control system may allow higher levels of wheel spin in the low friction mode than in the high friction mode.

Optionally, the braking control system provides a greater level of braking assistance in the high friction mode than in the low friction mode.

Optionally, the powertrain control means is arranged to provide lower levels of drive torque, for a given accelerator or throttle pedal position, at least at low levels of accelerator pedal depression, in the low friction mode than in the high friction mode.

Optionally, the transmission system is arranged to operate in higher gears for a given value of said at least one parameter in the high friction mode than in the low friction mode.

Optionally, the differential system is arranged to provide higher levels of differential lock in the low friction mode than in the high friction mode.

Optionally, the high friction mode may comprise a standard or default mode in which the vehicle will operate normally and which is suitable for on-road driving.

Optionally, there are at least two such low friction modes and the suspension system is arranged to provide a higher ride height in one of the low friction modes than in the other.

Further optionally, there are at least two such low friction modes and the suspension system is arranged to provide a higher level of said cross linking in one of the low friction modes than in the other.

Optionally, the at least two low friction modes may comprise a mud mode suitable for traveling through deep mud, and another low friction mode suitable for driving in snow, on grass, or on gravel.

Optionally there may be a plurality of low friction modes, one of which may be a grass mode in which the subsystems are controlled in a manner suitable for driving on grass, one of which may be an ice mode in which the subsystems are controlled in a manner suitable for driving in ice, and one of which may be a mud mode in which the subsystems are controlled in a manner suitable for driving on mud.

Optionally one of the modes is a sand mode in which the subsystems are controlled in a manner suitable for driving on sand. At least one of the subsystems may be arranged, in the sand mode, to allow only relatively low levels of wheel spin when the vehicle is traveling at low speeds so as to avoid the vehicle wheels becoming submerged in sand, but to allow relatively high levels of wheel spin when the vehicle is traveling at higher speeds. Optionally, in the sand mode, the powertrain control system is arranged to provide relatively low levels of drive torque for a given throttle pedal position at low vehicle speeds and to provide relatively high levels of drive torque for a given throttle pedal position at higher vehicle speeds.

The off-road mode may be a rock crawl mode in which the subsystems are controlled in a manner suitable for driving over rocks. Alternatively it may be set up for more general off-road use. One or more other off-road modes may be provided in addition or instead.

One of the modes may be a rough-road mode in which the subsystems are controlled in a manner suitable for driving on rough roads, for example for driving at relatively high speeds over rough surfaces.

At least one of the modes may be a plough surface mode in which the brake control subsystem is arranged to allow a relatively high degree of wheel slip under braking. This may be useful, for example on snow or sand, where the build-up of matter in front of the wheels under braking can improve braking performance.

Optionally, at least one of the modes is an on-road mode in which the subsystems are controlled in a manner suitable for driving on-road. For example, one of the modes may be a highway or motorway mode in which the subsystems are controlled in a manner suitable for driving at high speed (typically 80 kph (50 mph) or more) on a substantially flat road surface. One of the modes may be a country road mode in which the subsystems are controlled in a manner suitable for driving on country roads, which generally have more frequent and tighter bends, resulting in a lower average speed and a less even vehicle speed.

The driving modes may be selectable by means of at least one of at least two inputs, one of which may be a terrain selection input arranged to influence the mode selected on the basis of the terrain selected, and the other of which may be a mode of use input arranged to influence the mode selected on the basis of a selected mode of use of the vehicle. Each of these inputs may be user-controlled inputs, or may be derived from one or more sensors.

The mode of use input may be arranged to allow selection between a plurality of driving styles, which may include, for example, a normal style, a sport style, and an economy style.

Alternatively, or in addition, the mode of use input may be arranged to allow selection between a plurality of states of the vehicle, for example including a towing state or a loaded state.

In a further aspect of the invention for which protection is sought there is provided a control system according to any preceding claim configured to operate in one of an active condition in which the system is configured to adjust a net turning moment on a vehicle in response to the driver-requested steering angle in dependence at least in part on the driving condition signal; and a standby condition in which the system does not adjust the net turning moment, in dependence on vehicle speed.

Optionally, the control system is operable to assume the active mode when vehicle speed is less than a steering intervention threshold value.

Optionally, the control system is configured when in the active mode to suspend change in an amount of torque applied to one or more wheels by a stability control system (SCS) in response to detection of understeer or oversteer.

Optionally, the SCS is operable only above an SCS activation threshold speed, wherein the steering intervention threshold value is greater than or substantially equal to the SCS activation threshold speed.

In some embodiments, intervention by one or more stability control systems such as a dynamic stability control system (DSC), traction control system (TCS) or the like may be suspended when a side-slope condition is detected. In some embodiments yaw correction, for example to compensate for understeer or oversteer, may be suspended whilst traction control, to compensate for wheel spin during acceleration, may continue to operate according to subsystem configuration parameters for the traction control subsystem selected according to the control mode in which the system is operating.

This feature has the advantage that vehicle composure may be enhanced because a specific control methodology is employed to compensate for yaw error when a side-slope condition exists rather than relying on a stability control system optimized for travel over relatively level ground. Embodiments of the present invention enable a substantial enhancement in vehicle composure when negotiating side-slopes and enhance driver confidence in vehicle handling as well as occupant comfort.

Optionally, the control system is configured to receive a plurality of driving condition signals relating to a plurality of respective driving conditions, each signal having an associated level of turning moment associated therewith, the control system being configured to cause a turning moment to be induced on the vehicle in dependence on the plurality of driving condition signals.

That is, the control system may determine the amount of the turning moment to be applied at a given moment in time at least in part in dependence on the particular combination of driving condition signals received. For example one of the driving condition signals may relate to the nature of the terrain over which the vehicle is travelling and indicate whether the vehicle is traveling in a control mode appropriate to travel over grass, over mud, or over sand. Another one of the driving condition signals may indicate whether or not the vehicle is traveling with a speed control system active. If the speed control system is actively controlling speed the control system may be configured to provide less steering assistance for a given control mode in some embodiments. In some alternative embodiments, the control system may provide greater steering assistance if the speed control system is active, for a given control mode. In some embodiments the control system may provide more steering assistance in certain control modes when the speed control system is active, and less steering assistance in certain other control modes when the speed control system is active. Other arrangements are also useful.

In an aspect of the invention for which protection is sought there is provided a vehicle comprising a system according to an aspect of the invention.

Optionally, the vehicle is adapted for off-road driving.

According to one aspect of the invention for which protection is sought there is provided a control system for a motor vehicle comprising: means for detecting a driver-requested steering angle of a vehicle; means for independently controlling an amount of torque applied to each of a plurality of wheels of a vehicle; and means for receiving a driving condition signal indicative of a driving condition of a vehicle, the system being configured to determine control the amount of torque applied to each of the plurality of wheels in order to induce a net turning moment on the vehicle in response to the driver-requested steering angle, the amount of torque being determined in dependence at least in part on the driving condition signal.

The system may be configured to determine a net turning moment to be applied to the vehicle by application of torque to one or more wheels of the vehicle.

The means for independently controlling the torque applied to each of the plurality of wheels may comprise means for controlling torque applied by means of a braking system or a powertrain or a braking system in combination with a powertrain.

The control system may comprise one or more controllers. It is to be understood that the controller or controllers described herein may comprise a control unit or computational device having one or more electronic processors. The system may comprise a single control unit or electronic controller or alternatively different functions of the controller may be embodied in, or hosted in, different control units or controllers. As used herein the term "control unit" will be understood to include both a single control unit or controller and a plurality of control units or controllers collectively operating to provide the stated control functionality. A set of instructions could be provided which, when executed, cause said computational device to implement the control techniques described herein. The set of instructions could be embedded in said one or more electronic processors. Alternatively, the set of instructions could be provided as software to be executed on said computational device. The controller may be implemented in software run on one or more processors. One or more other controllers may be implemented in software run on one or more processors, optionally the same one or more processors as the controller. Other arrangements may be useful in some embodiments.

In a further aspect of the invention for which protection is sought there is provided a method of controlling a vehicle implemented by computing means comprising:

detecting a driver-requested steering angle of a vehicle;

inducing a turning moment on a vehicle; and receiving a driving condition signal indicative of a driving condition of a vehicle, the method comprising adjusting a net turning moment on a vehicle in response to the driver-requested steering angle in dependence at least in part on the driving condition signal.

The computing means may comprise at least one electronic computing device.

In one aspect of the invention for which protection is sought there is provided a carrier medium carrying computer readable code for controlling a vehicle to carry out a method according to an aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which:

FIG. 3 is a table showing which vehicle subsystem configuration mode is selected in each respective vehicle operating mode;

DETAILED DESCRIPTION

Figure 1:
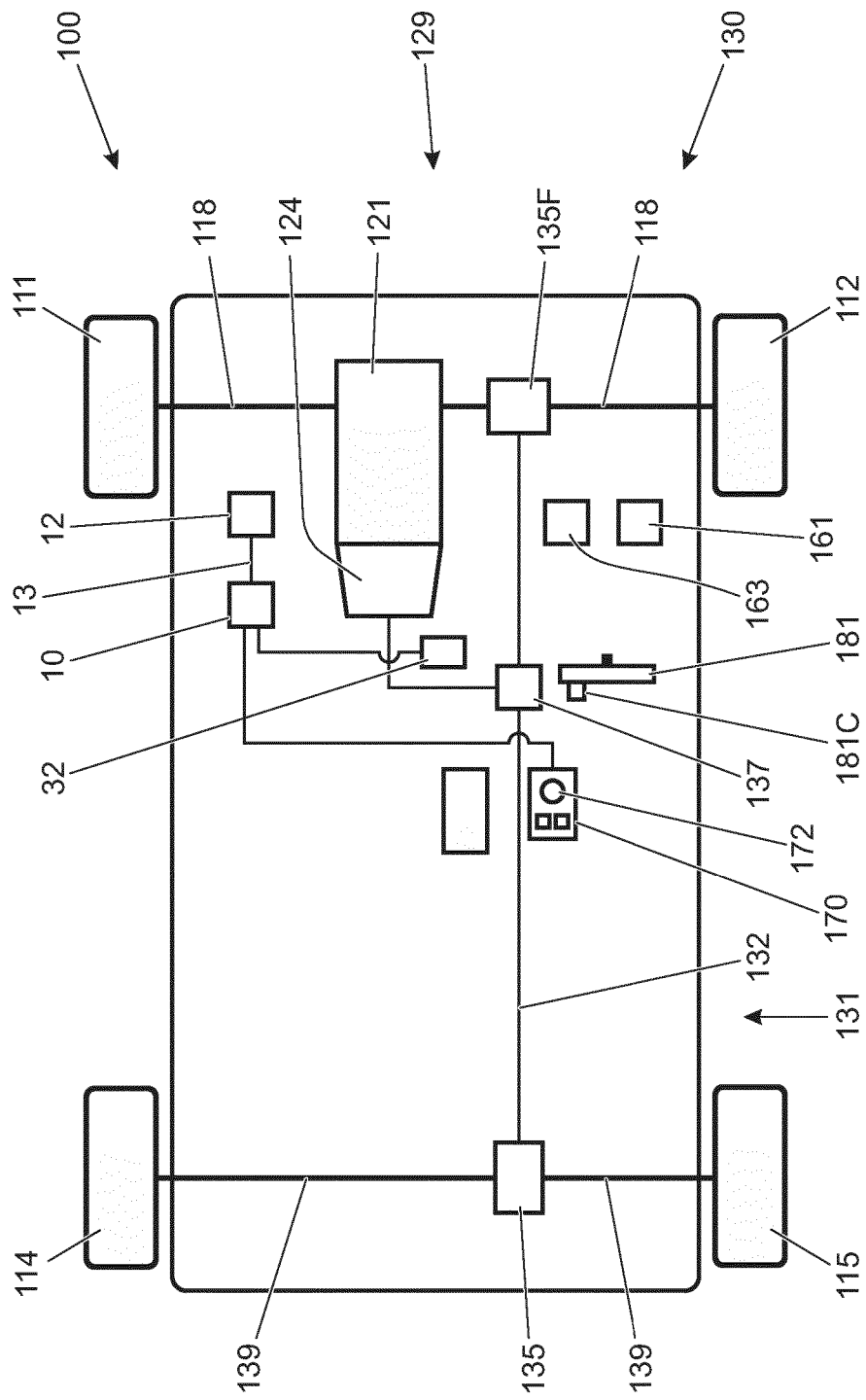
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road, as well as on-road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission 124 is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 137 is operable in a 'high ratio' or a 'low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 100 has an accelerator pedal 161, brake pedal 163 and steering wheel 181. The steering wheel 181 has a cruise control selector button 181C mounted thereto.

The vehicle 100 has a central controller, referred to as a vehicle control unit (VCU) 10. The VCU 10 receives and outputs a plurality of signals to and from various sensors and subsystems 12 provided on the vehicle 100.

Figure 2:
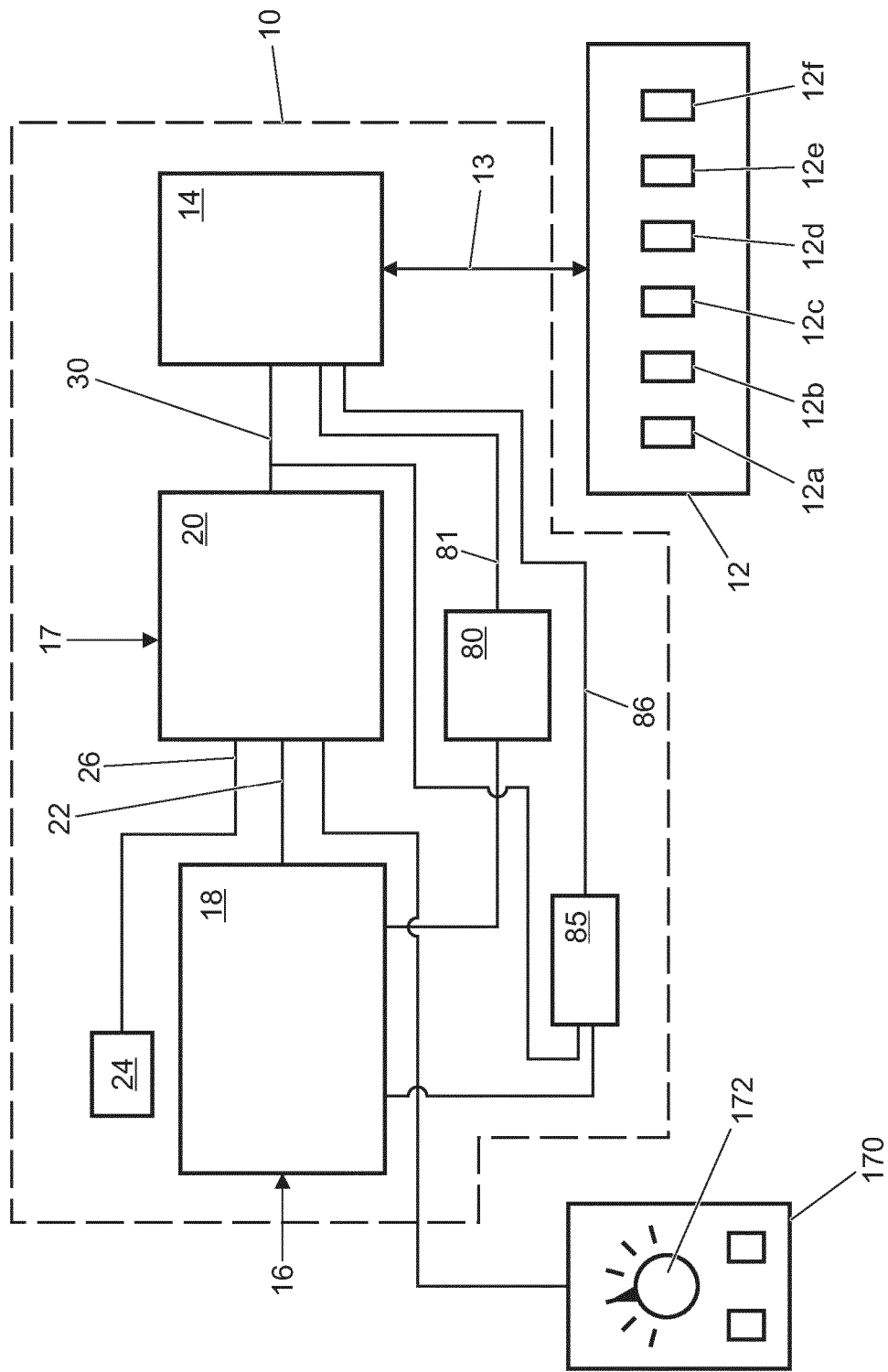
FIG. 2 is a block diagram to illustrate a vehicle control system in accordance with an embodiment of the invention, including various vehicle subsystems under the control of the vehicle control system.

FIG. 2 shows the VCU 10 in more detail. The VCU 10 controls a plurality of vehicle subsystems 12 including, but not limited to, an engine management system 12a, a transmission system 12b, an electronic power assisted steering unit 12c (ePAS unit), a brakes system 12d, a suspension system 12e and a driveline system 12f. Although six subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle 100 is travelling (referred to as the terrain condition). The subsystems 12 also communicate with the subsystems control module 14 via signal line 13 to feedback information on subsystem status. In some embodiments, instead of an ePAS unit 12c, a hydraulically operated power steering unit may be provided.

The VCU 10 receives a plurality of signals, represented generally at 16 and 17, which are received from a plurality of vehicle sensors and are representative of a variety of different parameters associated with vehicle motion and status. As described in detail in GB2492655, the signals 16, 17 provide, or are used to calculate, a plurality of driving condition indicators (also referred to as terrain indicators) which are indicative of the nature of the condition in which the vehicle is travelling. One advantageous feature of some embodiments of the present invention is that the VCU 10 determines the most appropriate control mode for the various subsystems on the basis of the terrain indicators, and automatically controls the subsystems accordingly. That is, the VCU 10 determines the most appropriate control mode on the basis of the terrain indicators and automatically causes each of the subsystems 12 to operate in the respective subsystem configuration mode corresponding to that control mode.

The sensors (not shown) on the vehicle include, but are not limited to, sensors which provide continuous sensor outputs 16 to the VCU 10, including wheel speed sensors, an ambient temperature sensor, an atmospheric pressure sensor, tire pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor output signals 17 to the VCU 10, including a cruise control status signal (ON/OFF), a transfer box or PTU 137 status signal (whether the gear ratio is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension ride-height status signal (HI/LO), and a Dynamic Stability Control (DSC) signal (ON/OFF).

The VCU 10 includes an evaluation means in the form of an estimator module or processor 18 and a calculation and selection means in the form of a selector module or processor 20. Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw rate, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel 181 (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes (and therefore corresponding subsystem configuration modes) is most appropriate based on the indicators of the type of terrain in which the vehicle is travelling. The most appropriate control mode is determined by analyzing the probability that each of the different control modes is appropriate on the basis of the terrain indicator signals 22, 26 from the estimator module 18 and the road roughness module 24.

The vehicle subsystems 12 may be controlled automatically in a given subsystem control mode (in an "automatic mode" or "automatic condition" of operation of the VCU 10) in response to a control output signal 30 from the selector module 20 and without the need for driver input. The control output signal 30 indicates the control mode in which the subsystems 12 are to be operated.

As noted above, the VCU 10 includes a subsystem control module 14 which provides control signals via line 13 to each of the vehicle subsystems 12 to initiate control of the subsystems in a manner appropriate to the driving conditions. Respective control modes of the VCU 10 correspond to different driving conditions and the signal 30 may be referred to as a driving condition signal.

Alternatively, the vehicle subsystems 12 may be operated in a given subsystem control mode according to a manual user input (in a "manual mode" or "manual condition" of operation of the VCU 10) via a Human Machine Interface (HMI) module 32. Thus the user determines in which subsystem control mode the subsystems will be operated by selection of a required system control mode (operating mode). The HMI module 32 comprises a display screen (not shown) and a user operable switchpack 170. The user may select between the manual and automatic modes (or conditions) of operation of the VCU 10 via the switchpack 170 by causing a control knob 172 to toggle between a retracted position and an exposed position, by pressing on the knob 172. When the knob 172 is in the exposed position the VCU 10 operates in the manual mode or condition. The switchpack 170 also allows the user to select the desired subsystem control mode by rotation of control knob 172 when in the manual mode or condition.

If the VCU 10 is operating in the manual condition, control output signal 30 provides a signal corresponding to the user-selected control mode.

It is to be understood that the subsystem controller 14 may itself control the vehicle subsystems 12a-12f directly via the signal line 13, or alternatively each subsystem may be provided with its own associated intermediate controller (not shown in FIG. 1) for providing control of the relevant subsystem 12a-12f. In the latter case the subsystem controller 14 may only control the selection of the most appropriate subsystem control mode for the subsystems 12a-12f, rather than implementing the actual control steps for the subsystems. The or each intermediate controller may in practice form an integral part of the main subsystem controller 14.

FIG. 3 is a table taken from US2003/0200016 showing the particular sub-system configuration modes assumed by the subsystems 12 of the vehicle 100 in the respective different operating modes in which the VCU 10 may operate.

The operating modes are:
(a) A motorway (or highway) mode;
(b) A country road mode;
(c) A city driving (urban) mode;
(d) A towing (on-road) mode;
(e) A dirt track mode;
(f) A snow/ice (on-road) mode;
(g) A grass/gravel/snow (GGS) mode;
(h) A sand mode;
(i) A rock crawl (RC) or boulder crossing mode; and
(j) A mud/ruts (MR) mode With reference to FIG. 3, the configuration of the suspension system 12e is specified in terms of ride height (high, standard or low) and side/side air interconnection. The suspension system 12e is a fluid suspension system, in the present embodiment an air suspension system, allowing fluid interconnection between suspensions for wheels on opposite sides of the vehicle in the manner described in US2003/0200016. The plurality of subsystem configuration modes provide different levels of said interconnection, in the present case no interconnection (interconnection closed) and at least partial interconnection (interconnection open).

The configuration of the ePAS steering unit 12c may be adjusted to provide different levels of steering assistance, wherein steering wheel 181 is easier to turn the greater the amount of steering assistance. The amount of assistance may be inversely proportional to vehicle speed in some operating modes.

The brakes system 12d may be arranged to provide relatively high brake force for a given amount of pressure applied to the brake pedal 163 or a relatively low brake force, depending on the operating mode.

The brakes system 12d may also be arranged to allow different levels of wheel slip when an anti-lock braking system is active, (relatively low amounts on low friction ("low-mu" surfaces) and relatively large amounts on high friction surfaces).

An electronic traction control (ETC) system may be operated in a high mu or low mu configuration, the system tolerating greater wheel slip in the low mu configuration before intervening in vehicle control compared with a high mu configuration.

A dynamic stability control system (DSC) may also be operated in a high mu or low mu configuration.

The engine management system 12a may be operated in 'quick' or 'slow' accelerator (or throttle) pedal progression configuration modes in which an increase in engine torque as a function of accelerator pedal progression is relatively quick or slow, respectively. The rate may be dependent on speed in one or more modes such as Sand mode.

The PTU 137 may be operated in a high range (HI) subsystem configuration mode or low range (LO) subsystem configuration mode as described herein.

The transmission 124 may be operated in a "normal" mode that provides a reasonable compromise between fuel economy and driving performance, a "performance" mode which generally keeps the transmission 124 in lower gears than in the normal mode, particularly when the driver is requesting a high level of driving torque to accelerate the vehicle 100, and a "manual" mode in which the control of gear changes is given completely to the driver. There is also a "snow" or "ice" mode which generally keeps the transmission 124 in higher gears than the normal mode, in particular under acceleration from rest, to avoid loss of traction due to wheel spin, and a "sand" mode which keeps the transmission 124 in relatively high gears at low speed to avoid excessive wheel spin. Excessive wheel spin can result in the wheels digging themselves into the sand at low speeds. However, the sand mode uses relatively low gears at higher speeds where a relatively high degree of wheel slip can be desirable to provide maximum traction. Lower gearing also helps the engine 121 to remain in an operating region where the engine speed is high and the power output is high, thereby helping to avoid the vehicle 100 becoming "bogged down" by a lack of power.

In some embodiments, a center differential and a rear differential each include a clutch pack and are controllable to vary the degree of locking between a "fully open" and a "fully locked" state. The actual degree of locking at any one time may be controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. A front differential could also be controlled in the same or similar way.

The VCU 10 has a steering compensation module 85 configured to receive signals input to and calculated by the estimator module 18. In particular, the steering compensation module 85 monitors a steering wheel angle signal, vehicle speed signal, powertrain torque demand and a signal indicating the selected control mode in which the VCU 10 is operating, received from selector module or processor 20. The powertrain torque demand signal may correspond to driver torque demand unless a speed control system is actively controlling vehicle speed, in which case the powertrain torque demand signal may correspond to the output from a speed control system.

When vehicle speed is below a steering compensation threshold speed, spd_steer_threshold, the VCU 10 is configured to command the subsystem controller 14 to cause a turning moment to be induced on the vehicle 100 by torque vectoring between wheels of the vehicle 100. In the present embodiment the steering compensation threshold speed is 15 kph although other values such as 5 kph, 10 kph, 20 kph or any other suitable value are also useful.

The steering compensation module 85 applies the values of steering wheel angle, vehicle speed, powertrain torque demand and selected control mode to a look-up table that outputs a value of turning moment that is to be induced on the vehicle 100 by torque vectoring. Additionally or alternatively, the look-up table may provide net Tq values by wheel, so as to achieve the desired turning moment.

In the case that a steering angle is substantially zero, corresponding to a straight-ahead direction of travel, in the present embodiment the turning moment is substantially zero. However, as the steering angle becomes increasingly positive by turning in a clockwise direction or anticlockwise direction, the VCU 10 commands an increasingly large turning moment to be induced on the vehicle 100 in a correspondingly clockwise or anticlockwise direction.

The module 85 outputs a command via signal line 86 to subsystem control module 14 which in turn causes engine management system 12*a*, driveline controller 12*f* and brakes system 12*d* to cause a turning moment to be established by torque vectoring, that is by varying the amount of torque applied to one or more wheels of the vehicle 100 in order to induce a turning moment.

In the present embodiment, torque vectoring is employed by a combination of application of braking force by means of the brakes system 12*d* (torque vectoring by braking, TVB) and distribution of drive torque between wheels by means of powertrain 129 via engine management system 12*a* and driveline system 12*f* (torque vectoring by powertrain, TVP). In the present embodiment TVB may be employed to establish the turning moment when the accelerator pedal 161 is not depressed whilst TVP may be employed to establish the turning moment when the accelerator pedal 161 is depressed. In some embodiments, TVB may be employed in addition to TVP if the available powertrain torque is insufficient to establish the required turning moment by TVP alone.

The amount of the turning moment is determined at least in part by reference to the instant control mode in which the VCU 10 is operating.

In some embodiments, the VCU 10 is configured to command ePAS unit 12*c* to increase or decrease steerable road wheel angle in order to adjust a turning moment on the vehicle 100. The increase or decrease in steerable road wheel angle may be made in addition to or instead of torque vectoring.

In some embodiments, in addition or instead the amount of steering assistance provided by the ePAS may be varied in dependence on the turning moment that it is desired to induce on the vehicle 100. The amount of steering assistance may be varied in such a manner as to communicate differences in the prevailing terrain to the driver.

A center differential or other means may be employed for proportioning torque between front and rear axles. It is to be understood that it may be desirable to increase the proportion of torque applied to rear wheels in certain situations as noted above.

Figure 4:
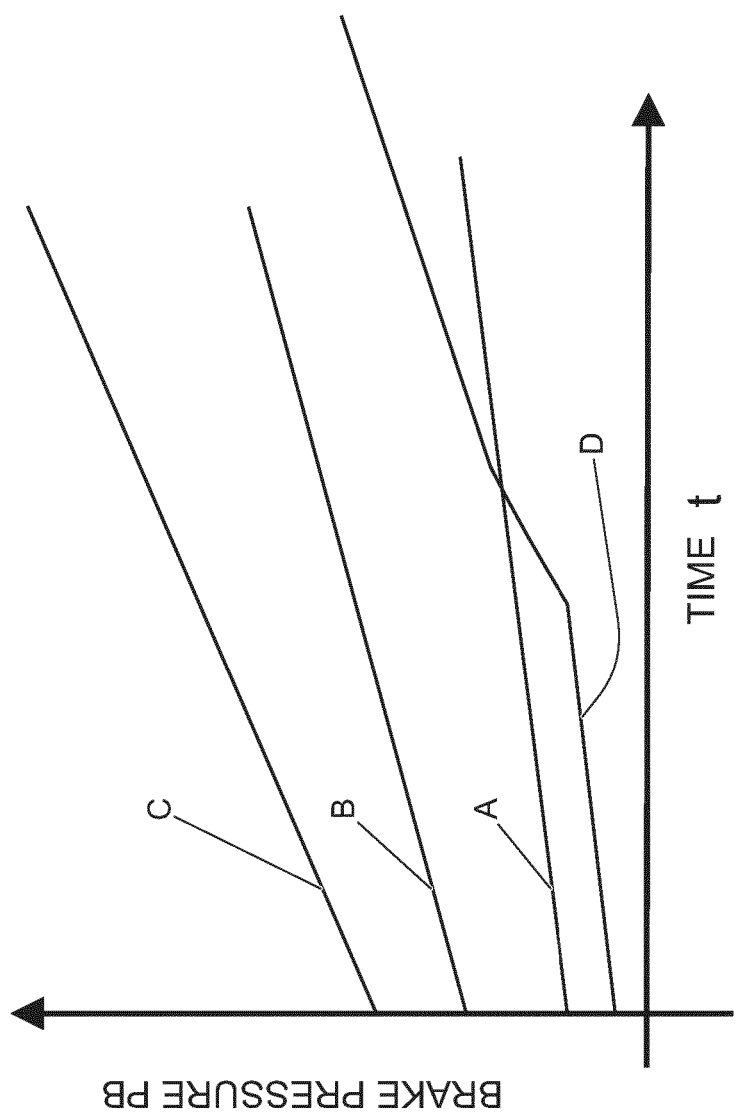
FIG. 4 is a plot of brake pressure PB as a function of time t for the same value of steering angle set by a driver, as a function of control mode, when torque vectoring by braking only is applied to assist turning of a vehicle in an embodiment.

As noted above, in the present embodiment steering assistance may be provided by TVB and TVP. It is to be understood however that the provision of TVP may be more difficult in certain circumstances, for example in the case that a driver has released the accelerator pedal whilst the vehicle is moving. In the present embodiment the VCU 10 is configured to provide steering assistance by inducing a turning moment on the vehicle 100 by torque vectoring by braking, with TVP employed in certain control modes when TVP is available. FIG. 4 illustrates the amount of brake pressure PB (in arbitrary units) that the VCU 10 causes a brake system to apply to an inside rear wheel of the vehicle 100 as a function of time t for the same value of steering angle set by a driver, as a function of control mode, when TVB only is applied. In some embodiments TVP is not employed in order to provide steering assistance.

It is to be understood that the actual value of brake pressure PB will depend on the steering angle set, the value of PB increasing with increasing steering angle in the present embodiment.

Trace A of FIG. 4 is suitable for driving on surfaces of relatively low surface coefficient of friction, for example less than 0.3, and this trace corresponds to the GGS control mode. It can be seen that brake pressure is applied at a relatively low value to begin with, the amount of brake pressure increasing gradually over time. In the present embodiment, brake pressure is applied to both front and rear inside wheels when in GGS mode. This is so as to distribute braking over a larger area of contact between the vehicle and ground, i.e. over front and rear wheel contact patches, rather than only one wheel such as only the rear wheel. In some embodiments the amount of brake pressure applied may be proportioned such that a greater amount of brake pressure is applied to the front or rear wheel. In some embodiments, a greater amount of pressure is applied to the rear wheel than the front wheel when in the GGS control mode.

Trace B is suitable for driving on surfaces of medium levels of surface coefficient of friction, for example in the range 0.3-0.7, and this trace corresponds to the MR control mode. It can be seen that the amount of initial brake pressure is higher than the initial brake pressure value applied when in the GGS control mode. The rate of increase of brake pressure with time is also higher in the case of trace B compared with trace A. It is to be understood that, in the case that steering assistance were to be provided in an on-road control mode, trace B may be suitable for wet on-road surfaces. In the MR control mode brake pressure is applied to the rear inside wheel only, rather than both front and rear inside wheels.

Trace C is suitable for driving on surfaces having a relatively high level of surface coefficient of friction, for example above 0.7. This trace might be employed for example in the event that steering assistance is provided in a control mode such as the rock crawl (RC) mode or an on-road control mode (sometimes referred to as 'special programs off' (SPO) mode). It can be seen that the amount of initial brake pressure is higher than each of traces A and B, and the amount of pressure increases at a higher rate as a function of time. As in the case of the MR control mode, in the RC control mode brake pressure is applied to the rear inside wheel only, rather than both front and rear inside wheels.

Trace D is suitable for driving on sand, and this trace corresponds to the sand control mode. It can be seen that the amount of initial brake pressure applied is lower than in each of traces A, B and C. this is at least in part because locking of a wheel when driving in sand can result in a wheel becoming rapidly embedded in the driving surface, which could result in a dramatic increase in the amount of yaw moment induced on the vehicle. Accordingly, the amount of brake pressure is relatively low in order to avoid wheel lock.

Furthermore, the amount of brake pressure increases as a function of time at a relatively low rate initially. This is because, when driving on a deformable surface such as sand, a build-up of surface material ahead of the wheel occurs because the wheel speed is lower than the speed of the vehicle over ground. An increase in the turning moment on the vehicle due to that wheel increases as the amount of surface material increases, without requiring an increase in brake pressure. After a predetermined time period the rate of increase of brake pressure increases temporarily, before reducing to a value that is still higher than the initial rate of increase, in an attempt to further increase the turning moment on the vehicle.

In the present embodiment, when in the sand control mode brake pressure is applied to the rear inside wheel only, rather than both front and rear inside wheels. In some alternative embodiments, however, brake pressure may be applied to both front and rear inside rear wheels when in the sand mode. The amount of brake pressure applied may be proportioned such that a greater amount of brake pressure is applied to the front or rear wheel. In some embodiments, a greater amount of pressure is applied to the rear wheel than to the front wheel when in sand mode.

It is to be understood that the form of the changes in brake pressure as a function of time such as the number of incremental increases and holds in brake pressure may be determined in dependence on one or more of vehicle speed, incline, side slope angle and steering angle as well as the prevailing control mode.

In some embodiments the VCU 10 is configured to reduce the amount of brake pressure applied, once brake pressure has been applied in order to induce a turning moment on the vehicle. A combination of increases in brake pressure and decreases in brake pressure may be employed depending on the prevailing control mode.

It is to be understood that in the embodiments illustrated the amount of brake pressure is arranged to increase as a function of time in order to attempt to correct for overshoot of an intended path of travel of a vehicle due to understeer when driving on a given surface. It is to be understood that in the present embodiment and some other embodiments, the amount of brake pressure set initially may increase as a function of increasing steering angle.

In some alternative embodiments, the system may be configured such that the amount of brake pressure does not increase over time, but rather remains at a substantially fixed value for a given vehicle steering angle.

In embodiments in which TVP may be provided, where available, in addition to or instead of TVB.

Figure 5:
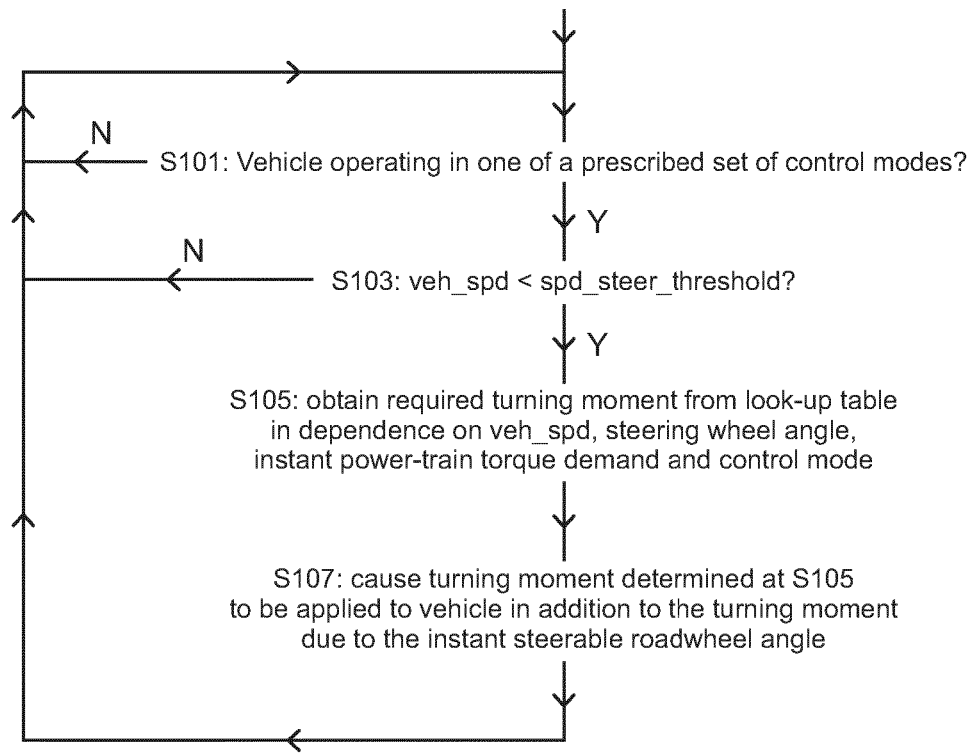
FIG. 5 is a schematic illustration of a method of operation of a vehicle according to an embodiment of the present invention.

FIG. 5 illustrates a method of operating of a vehicle 100 according to an embodiment of the present invention.

At step S101 VCU 10 of vehicle 100 determines whether the VCU 10 is operating in one of a prescribed set of control modes. In the present embodiment the set of control modes includes the Sand mode, GGS mode and MR mode. The prescribed set does not include the default on-road mode, SPO, in the present embodiment, this mode may be included in the prescribed set in some alternative embodiments.

If the VCU 10 is operating in one of prescribed set of modes, the VCU 10 continues at step S103 otherwise the VCU 10 continues at step S101.

At step S103 the VCU 10 makes a determination whether the speed of the vehicle 100 veh_spd is below the steering compensation threshold speed value spd_steer_threshold.

If at step S103 the VCU 10 determines that veh_spd<spd_steer_threshold, the VCU 10 continues at step S105, otherwise the VCU repeats step S101.

At step S105 the VCU 10 inputs to a look-up table (LUT) stored in a memory thereof the values of veh_spd, steering wheel angle, instant powertrain torque demand and currently selected control mode in order to obtain a value of turning moment that is to be applied to the vehicle 100 in addition to the turning moment due to the instant steerable roadwheel angle. The VCU then continues at step S107.

At step S107 the VCU 10 commands, via subsystem controller 14, one or more vehicle subsystems 12 to cause the turning moment to be applied in addition to the turning moment induced as a consequence of the instant steerable roadwheel angle, as described above. The VCU then continues at step S101.

It is to be understood that in some embodiments the VCU 10 may be configured to determine an actual path or course of the vehicle 100 over ground at a given moment in time and to adjust the amount of the turning moment applied in order to cause the course of the vehicle 100 to correspond substantially to the rate of turn of the vehicle 100 expected for the current steering angle if substantially no understeer were occurring. Other arrangements may be useful.

Embodiments of the present invention have the advantage that vehicle composure may be enhanced because a specific control methodology is employed to compensate for understeer on a driving surface due to terrain over which the vehicle is driving.

Optionally, the VCU 10 may be arranged to provide a plurality of user-configurable levels of assistance. The levels of assistance may be arranged such that an amount of turning moment imposed on the vehicle under a given set of conditions is greater when a higher level of assistance is requested than a lower level of assistance. Other configurations may be useful.

Embodiments of the present invention may be particularly useful where a vehicle 100 is travelling at relatively low speeds, on surfaces where intervention by a stability control system such as a dynamic stability control system (DSC) to reduce vehicle understeer is either suspended automatically by the system in order to prevent repeated intervention by the stability control system on a particular driving surface, or where speed is below a minimum speed at which the stability control system is operable. It is to be understood that repeated intervention by a stability control system may result in a reduction in vehicle composure and an increase in noise, vibration and harshness associated with vehicle operations. In some embodiments repeated intervention by a stability control system may result in undesirable modification to a driving surface such as gravel.

Accordingly, embodiments of the present invention implement a control methodology in which a turning moment is applied to a vehicle 100 automatically under certain conditions, the amount of the turning moment being selected in dependence on the control mode in which the system is operating. The methodology therefore acts pre-emptively in anticipation of understeer on a given surface in order to induce an additional turning moment on a vehicle. The amount of the additional turning moment is tuned in some embodiments to cause a vehicle 100 to follow a path that would otherwise be followed if the vehicle 100 were operating on a smooth surface having a relatively high surface coefficient of friction.

In some embodiments, HMI 32 may be arranged to display a graphical representation of the vehicle 100 to the driver along with a representation in real time of the amount of assistance (turning moment) the system is providing. This feature may be useful in enabling a driver to assess an extent to which the VCU 10 is intervening in vehicle 100 control and therefore an amount by which the turning moment may or may not be increased in order to continue to assist vehicle motion over a driving surface. A driver may therefore may therefore gauge how closely they are pushing the VCU 10 towards its limit of intervention in providing steering assistance.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a motor vehicle, the system being configured to operate in a selected one of a plurality of terrain control modes of at least one subsystem of the vehicle, and the system comprising:
    means for detecting a positive driver-requested steering angle of the vehicle;
    means for inducing a turning moment on the vehicle;
    means for receiving a terrain condition signal indicative of the nature of the terrain over which the vehicle is travelling; and
    a subsystem controller for initiating control of at least one subsystem in the selected one of the plurality of subsystem terrain control modes, each of which corresponds to one or more of the different terrain conditions, the terrain condition signal being indicative of the selected terrain control mode,
    wherein the system is configured to cause an initial change in turning moment and to adjust a net turning moment on the vehicle automatically in response to the positive driver-requested steering angle in dependence at least in part on the terrain condition signal.

2. A control system according to claim 1 wherein the amount by which the turning moment is adjusted may be arranged to increase as a function of time.

3. A control system according to claim 2 wherein the rate of increase of the amount by which the turning moment is adjusted is determined in dependence on the terrain condition signal.

4. A control system according to claim 1 configured to adjust the net turning moment on the vehicle so as to increase a rate of turn of the vehicle in a direction corresponding to the positive driver-requested steering angle in dependence on the terrain condition signal.

5. A control system according to claim 4 configured to adjust the net turning moment on a vehicle to increase a rate of turn when the terrain condition signal corresponds to one of a first set of one or more terrain conditions.

6. A control system according to claim 5 configured to adjust the net turning moment on a vehicle so as to decrease a rate of turn of a vehicle in a direction corresponding to the positive driver-requested steering angle in dependence on the terrain condition signal.

7. A control system according to claim 6 configured to adjust the net turning moment on a vehicle to decrease a rate of turn when the terrain condition signal corresponds to one of a second set of one or more terrain conditions.

8. A control system according to claim 7 wherein the second set of one or more terrain conditions are different from the first.

9. A control system according to claim 1 configured to adjust the net turning moment on a vehicle in response to the positive driver-requested steering angle in dependence at least in part on the terrain condition signal, at least in part by adjusting a steerable road wheel angle.

10. A control system according to claim 1 configured to adjust the net turning moment on a vehicle in response to the positive driver-requested steering angle in dependence at least in part on the terrain condition signal, at least in part by torque vectoring.

11. A control system according to claim 10 configured wherein torque vectoring is accomplished by varying the amount of torque applied to one or more wheels of a vehicle in order to induce a turning moment.

12. A control system according to claim 11 configured wherein torque vectoring may be accomplished at least in part by brake torque vectoring.

13. A control system according to claim 11 configured wherein torque vectoring may be accomplished at least in part by powertrain torque vectoring.

14. A system according to claim 1 operable in a manual terrain control mode selection condition in which a user may select a required system terrain control mode by means of user-operable terrain mode selection input means.

15. A control system according to claim 1 operable in an automatic terrain mode selection condition in which the system is configured to select automatically an appropriate system terrain control mode.

16. A control system according to claim 15 where the system comprises evaluation means for evaluating one or more terrain condition indicators to determine the extent to which each of the subsystem terrain control modes is appropriate, the system being configured in the automatic terrain mode selection condition automatically to control the subsystem controller to initiate control of one or more subsystems in the subsystem terrain control mode which is most appropriate.

17. A control system according to claim 1 wherein the terrain control modes are control modes of at least one vehicle subsystem selected from amongst an engine management system, a transmission system, a steering system, a brakes system and a suspension system.

18. A control system according to claim 17 wherein the terrain control modes are control modes of at least two vehicle subsystems selected from amongst an engine management system, a transmission system, a steering system, a brakes system and a suspension system.

19. A control system according claim 1 wherein in each terrain control mode the system is configured to cause each of the one or more vehicle subsystems to be operated in a subsystem configuration mode appropriate to the terrain condition.

20. A control system according to claim 19 wherein the terrain control modes include control modes of a suspension system and the plurality of subsystem configuration modes comprise a plurality of ride heights.

21. A control system according to claim 19 wherein the terrain control modes include control modes of a fluid suspension system in which fluid interconnection can be made between suspensions for wheels on opposite sides of the vehicle, and wherein said plurality of subsystem configuration modes provide different levels of said interconnection.

22. A control system according to claim 19 wherein the terrain control modes include control modes of a steering system which can provide steering assistance, and wherein said plurality of subsystem configuration modes provide different levels of said steering assistance.

23. A control system according to claim 19 wherein the terrain control modes include control modes of a brakes system which can provide braking assistance, and said plurality of subsystem configuration modes provide different levels of said braking assistance.

24. A control system according to claim 19 wherein the terrain control modes include control modes of a brake control system which can provide an anti-lock function to control wheel slip, and said plurality of subsystem configuration modes allow different levels of said wheel slip.

25. A control system according to claim 19 wherein the terrain control modes include control modes of a traction control system which is arranged to control wheel spin, and said plurality of subsystem configuration modes allow different levels of said wheel spin.

26. A control system according to claim 19 wherein the terrain control modes include control modes of a powertrain system which includes a powertrain control means and an accelerator or throttle pedal, the subsystem configuration modes providing different levels of responsiveness of the powertrain control means to movement of the accelerator or throttle pedal.

27. A control system according to claim 19 wherein the terrain control modes include control modes of a transmission system operable in a plurality of transmission ratios and including a transmission control means arranged to monitor at least one parameter of the vehicle and to select the transmission ratios in response, and wherein the subsystem configuration modes include a plurality of transmission configuration modes in which the transmission ratios are selected differently in response to said at least one parameter.

28. A control system according claim 1 configured to operate in one of
an active steering assistance condition in which the system is configured to cause an initial change in turning moment, and to adjust a net turning moment on the vehicle in response to the driver-requested steering angle in dependence at least in part on the terrain condition signal; and
a standby steering assistance condition in which the system does not adjust the net turning moment in dependence on the terrain condition signal,
the system operating in the active or standby steering assistance conditions in dependence on vehicle speed.

29. A control system according to claim 28 operable to assume the active mode when vehicle speed is less than a steering intervention threshold value.

30. A control system according to claim 29 configured when in the active mode to suspend change in an amount of torque applied to one or more wheels by a stability control system (SCS) in response to detection of understeer or oversteer.

31. A control system according to claim 30 wherein the SCS is operable only above an SCS activation threshold speed, wherein the steering intervention threshold value is greater than or substantially equal to the SCS activation threshold speed.

32. A control system according to claim 1 configured to receive a plurality of terrain condition signals relating to a plurality of respective terrain conditions, each signal having an associated level of turning moment associated therewith, the control system being configured to cause a turning moment to be induced on the vehicle in dependence on the plurality of terrain condition signals.

33. A vehicle comprising a chassis, a body attached to said chassis, a plurality of wheels, a powertrain to drive said wheels, a braking system to brake said wheels, and a system according to claim 1.

34. A vehicle according to claim 33 wherein the vehicle is adapted for off-road driving.

35. A control system according to claim 1, wherein the system is configured to cause an increasingly large turning moment on the vehicle automatically in response to an increasingly positive driver-requested steering angle.

36. A method of controlling a vehicle implemented by computing means, the vehicle having a system configured to operate in a selected one of a plurality of terrain control modes of at least one subsystem of the vehicle, and the method comprising:
detecting a positive driver-requested steering angle of the vehicle;
inducing a turning moment on the vehicle; and
receiving a terrain condition signal indicative of the nature of the terrain over which the vehicle is travelling; and
initiating control of at least one subsystem in the selected one of the plurality of subsystem terrain control modes, each of which corresponds to one or more of the different terrain conditions, the terrain signal being indicative of the selected terrain control mode, wherein the method comprises causing an initial change in turning moment, and adjusting a net turning moment on the vehicle in response to the positive driver-requested steering angle in dependence at least in part on the terrain condition signal.

* * * * *